US012280383B2

United States Patent
(12) United States Patent
Stangas et al.

(10) Patent No.: US 12,280,383 B2
(45) Date of Patent: Apr. 22, 2025

(54) PAINT BELL CUP FOR VEHICLE PAINT APPLICATION

(71) Applicant: GM Global Technology Operations LLC, Detroit, MI (US)

(72) Inventors: Deanna Stangas, Royal Oak, MI (US); Alonso Samuel Chavez, San Luis Potosi (MX); Octavio Addiel Pichardo, Celaya (GT); Hua-tzu Fan, Troy, MI (US); Ronald C. Daul, Northville, MI (US); Dominick Michael Lentine, Napa, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 509 days.

(21) Appl. No.: 17/690,266

(22) Filed: Mar. 9, 2022

(65) Prior Publication Data

US 2023/0285988 A1 Sep. 14, 2023

(51) Int. Cl.
*B05B 1/06* (2006.01)
*B05B 1/34* (2006.01)

(52) U.S. Cl.
CPC .............. *B05B 1/06* (2013.01); *B05B 1/3405* (2013.01)

(58) Field of Classification Search
USPC .......................... 118/323, 321; 239/223, 224
See application file for complete search history.

(56) References Cited

FOREIGN PATENT DOCUMENTS

| | | | | |
|---|---|---|---|---|
| GB | 2563054 A | * 12/2018 | .......... | B05B 3/1014 |
| JP | 2006181556 A | * 7/2006 | | |
| JP | 2006263554 A | * 10/2006 | | |
| JP | 2020199466 A | * 12/2020 | | |

OTHER PUBLICATIONS

English Translation JP2020199466A (Year: 2020).*

* cited by examiner

*Primary Examiner* — Yewebdar T Tadesse
(74) *Attorney, Agent, or Firm* — CANTOR COLBURN LLP

(57) ABSTRACT

A paint bell cup for directing a spray of paint onto a surface includes a cup body having an outer surface, an inner conical surface having a circumferential edge, and a stem extending from the outer surface. The stem includes a passage that delivers paint toward the inner conical surface. The cup body includes one or more spray control features that extend along the inner conical surface toward the circumferential edge. The one or more spray control features promote a selected uniform droplet size of the paint traveling from the stem toward the circumferential edge.

20 Claims, 4 Drawing Sheets

PAINT BELL CUP FOR VEHICLE PAINT APPLICATION

INTRODUCTION

The subject disclosure relates to the art of vehicles and, more particularly, to a paint bell cup for vehicle paint application.

Paint is typically applied to vehicle through a spray process. In some cases, an electrostatic spray process is employed. In an electrostatic spray process, paint may receive a positive charge and be applied to a surface having a negative charge. This difference in charge causes the paint to adhere to the surface. Spray systems often deliver paint through a frusto-conical or cone shaped paint bell cup. The paint bell cup develops and guides an atomized paint spray, comprised of paint particles, toward an object. Paint application quality may depend on paint droplet size.

A uniform paint droplet size leads to a uniform layer of paint with reduced overspray. Factors that contribute to paint droplet formation may include paint flow resistance, flow volume, friction, and charge-to-mass ratio. Paint flow resistance and friction are associated with properties of the paint and a shape of the paint bell cup. Unfortunately, it is not currently possible to tailor the shape of the paint bell cup to a particular paint, paint property, or flow property. As such, large quantities of paint are wasted as overspray. Accordingly, the industry would welcome a system for making a paint bell cup that is tailored to particular paint and/or paint application parameters.

SUMMARY

Disclosed in accordance with a non-limiting example, a paint bell cup for directing a spray of paint onto a surface includes a cup body having an outer surface, an inner conical surface having a circumferential edge, and a stem extending from the outer surface. The stem includes a passage that delivers paint toward the inner conical surface. The cup body includes one or more spray control features that extend along the inner conical surface toward the circumferential edge. The one or more spray control features promote a selected uniform droplet size of the paint traveling from the stem toward the circumferential edge.

In addition to one or more of the features described above or below, or as an alternative, further embodiments could include a diverter member arranged at the stem, the diverter member guiding the paint along the one or more spray control features on the inner conical surface.

In addition to one or more of the features described above or below, or as an alternative, further embodiments could include wherein the one or more spray control features include grooves formed on the inner conical surface, the grooves extending along the inner conical surface toward the circumferential edge.

In addition to one or more of the features described above or below, or as an alternative, further embodiments could include wherein the grooves extend from the stem across the inner conical surface and up to the circumferential edge.

In addition to one or more of the features described above or below, or as an alternative, further embodiments could include wherein the grooves extend from the circumferential edge and stop short of the stem.

In addition to one or more of the features described above or below, or as an alternative, further embodiments could include wherein the grooves extend substantially linearly across the inner conical surface.

In addition to one or more of the features described above or below, or as an alternative, further embodiments could include wherein the grooves extend curvilinearly across the inner conical surface.

In addition to one or more of the features described above or below, or as an alternative, further embodiments could include wherein the one or more spray control features include one of a plurality of raised elements and a plurality of recessed elements.

In addition to one or more of the features described above or below, or as an alternative, further embodiments could include wherein the one or more spray control features includes a raised element and a recessed element.

In addition to one or more of the features described above or below, or as an alternative, further embodiments could include wherein the plurality of raised elements include one of a plurality of raised bumps and plurality of raised ribs.

In addition to one or more of the features described above or below, or as an alternative, further embodiments could include wherein the plurality of raised elements forms a random pattern.

In addition to one or more of the features described above or below, or as an alternative, further embodiments could include wherein the plurality of raised elements forms a uniform pattern.

In addition to one or more of the features described above or below, or as an alternative, further embodiments could include wherein the cup body includes a lattice structure having a plurality of interconnected lattice elements.

In addition to one or more of the features described above or below, or as an alternative, further embodiments could include wherein the lattice structure include a plurality voids and an the outer surface includes a skin covering the lattice structure.

In addition to one or more of the features described above or below, or as an alternative, further embodiments could include wherein the inner conical surface includes a geometry defined by the equation:

$$\overrightarrow{s_1} = r(t)\vec{l} + z(t)\vec{k} = \left(r_0 e^{\frac{\omega^2 t^2}{2}} + v_0 t\right)\vec{l} - 0.5gt^2\vec{k}.$$

Disclosed in accordance with another non-limiting example is a paint spray system including a source of paint, a paint motive device connected to the source of paint, and a paint bell cup connected to the source of paint operable to direct a spray of paint from the source of paint motivated by the paint motive device onto a surface. The paint bell cup includes a cup body having an outer surface, an inner conical surface having a circumferential edge, and a stem extending from the outer surface. The stem includes a passage that delivers paint toward the inner conical surface. The cup body includes one or more spray control features that extend along the inner conical surface toward the circumferential edge. The one or more spray control features promote a selected uniform droplet size of the paint traveling from the stem toward the circumferential edge.

In addition to one or more of the features described above or below, or as an alternative, further embodiments could include wherein the one or more spray control features include grooves formed on the inner conical surface, the grooves extending along the inner conical surface toward the circumferential edge.

In addition to one or more of the features described above or below, or as an alternative, further embodiments could include wherein the one or more spray control features extend from the circumferential edge along the inner conical surface and stop short of the stem.

In addition to one or more of the features described above or below, or as an alternative, further embodiments could include wherein the one or more spray control features include one of a plurality of raised elements and a plurality of recessed elements.

In addition to one or more of the features described above or below, or as an alternative, further embodiments could include wherein the cup body includes a lattice structure having a plurality of interconnecting elements defining a plurality of voids.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
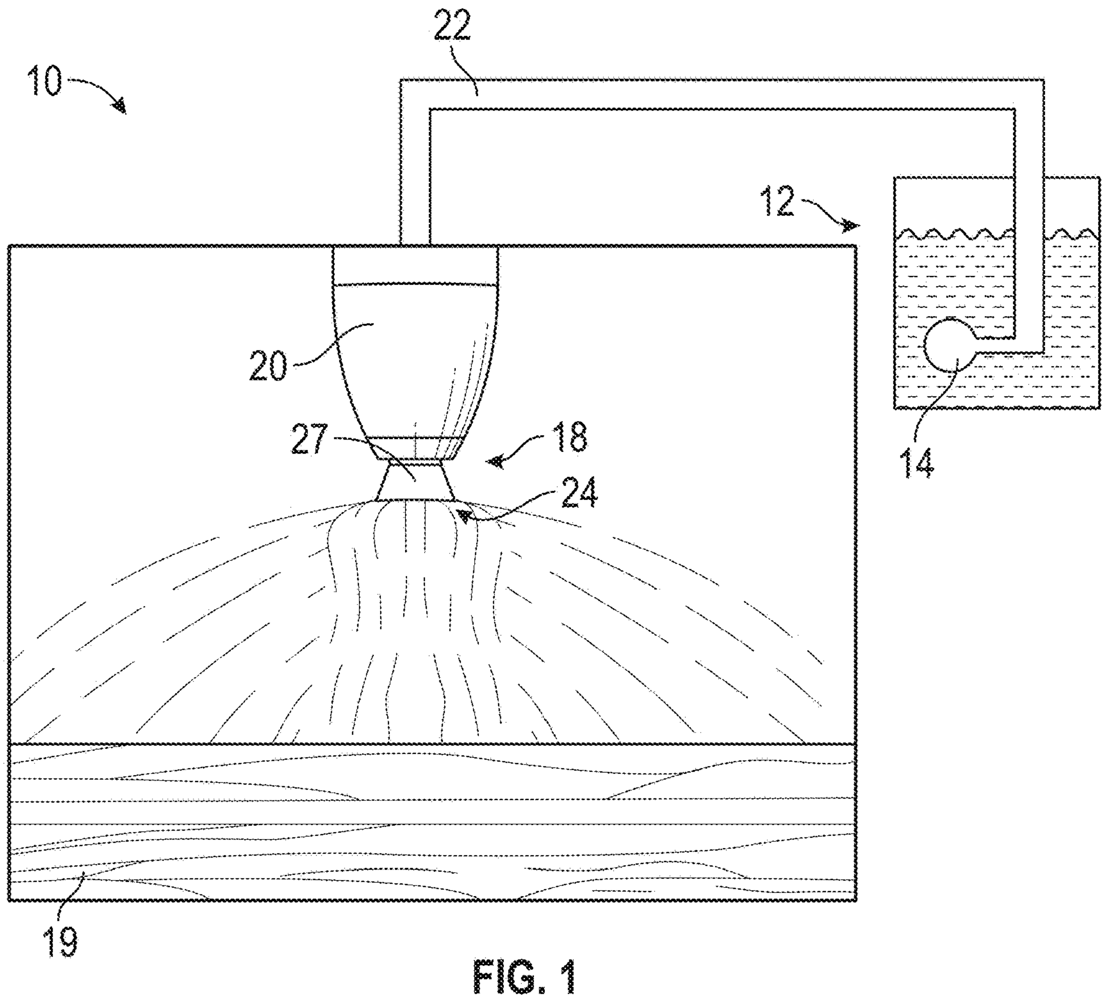
FIG. 1 is a schematic view of a paint spray system including a paint bell cup including spray control features, in accordance with a non-limiting example.

The following description is merely exemplary in nature and is not intended to limit the present disclosure, its application or uses. It should be understood that throughout the drawings, corresponding reference numerals indicate like or corresponding parts and features.

A paint spray system is indicated generally at 10 in FIG. 1, in accordance with a non-limiting example. Paint spray system 10 includes a source of paint 12 and a paint motive device 14. Paint motive device 14 may take the form of a pump, compressor or the like that is arranged in, or fluidically connected with, source of paint 12. Paint motive device 14 delivers paint from source of paint 12 to a spray delivery system 18. Spray delivery system 18 directs an atomized spray of paint onto a surface 19 which may take the form of a surface of a vehicle component (not separately labeled). Of course, it should be understood, that surface 19 may represent a surface of a wide array of objects.

Figure 2:
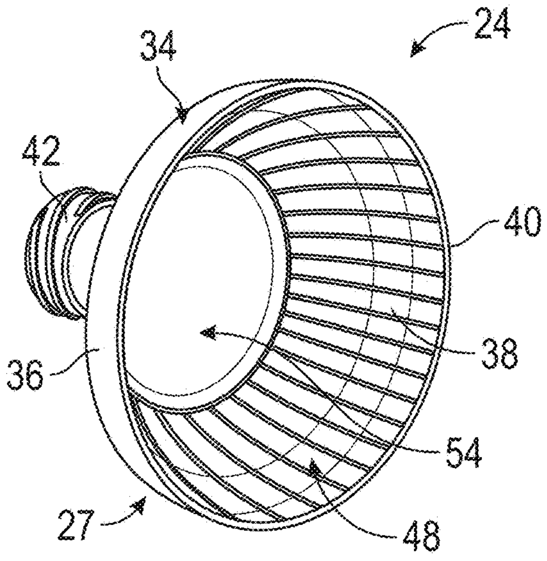
FIG. 2 is a perspective view of the paint bell cup of FIG. 1 including a paint bell cup and a diverter, in accordance with a non-limiting example.
Figure 3:
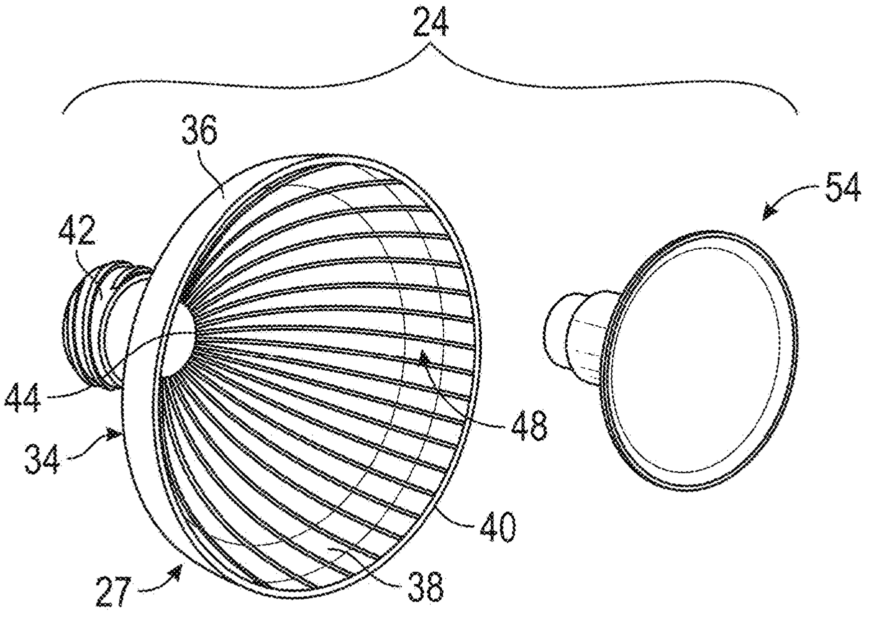
FIG. 3 is a disassembled view of the paint bell cup of FIG. 2, in accordance with a non-limiting example.

In a non-limiting example, spray delivery system 18 includes a paint bell cup holder 20 that is connected to source of paint 12 via a conduit 22. Paint bell cup holder 20 supports and retains a paint bell cup assembly 24 including a paint bell cup 27. During paint spray operations, paint bell cup holder 20 may rotate paint bell cup assembly 24 at a selected speed. Referring to FIGS. 2 and 3, paint bell cup 27 includes a cup body 34 having an outer surface 36 and an inner conical surface 38.

Cup body 34 includes a circumferential edge 40 and a stem 42. Stem 42 may include threads (not separately labeled) that provide an interface with paint bell cup holder 20. Of course, stem 42 may also be bare and connected to paint bell cup holder 20 through a taper, clamping forces, and the like. In a non-limiting example, stem 42 includes a passage 44 (FIG. 3) that is fluidically connected to source of paint 12 via conduit 22.

Figure 4:
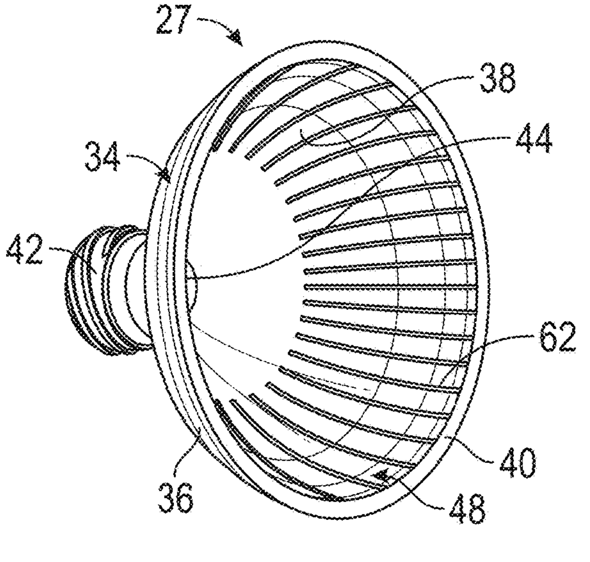
FIG. 4 is a perspective view of the paint bell cup of FIG. 3 having an inner conical surface with spray control features shown in the form of substantially linear grooves, in accordance with a non-limiting example.

In a non-limiting example, inner conical surface 38 includes one or more spray control features 48 that promote uniformity of paint spray drops by reducing frictional forces between the paint and cup body 34. In one non-limiting example, spray control features 48 may extend from stem 42 across inner conical surface 38 to circumferential edge 40 (FIG. 3). In another non-limiting example, spray control features 48 may extend from circumferential edge 40 over inner conical surface 38 and stop short of stem 42 (FIG. 4). In a non-limiting example, a diverter member 54 may be disposed in cup body 34 and connected to stem 42. Diverter member 54 forces paint from source of paint 12 to flow along inner conical surface 38 toward circumferential edge 40 and onto surface 19 as an atomized spray.

Referring to FIG. 4 and with continued reference to FIGS. 1-3, spray control features 48 take the form of a plurality of grooves 62 formed in inner conical surface 38 in accordance with a non-limiting example. Plurality of grooves 62 are substantially linear and extend along inner conical surface 38 toward circumferential edge 40. In one non-limiting example, plurality of grooves 62 extend from stem 42 up to circumferential edge 40 as shown in FIG. 3. In another non-limiting example, plurality of groove 62 extend from circumferential edge 40 along inner conical surface 38 and stop short of stem 42 as shown in FIG. 4. In another non-limiting example, plurality of grooves may stop short of circumferential edge 40. In another non-limiting example, plurality of grooves 62 extends from stem 42 along inner conical surface 38 and across circumferential edge 40.

In a non-limiting example, each of the plurality of grooves 62 include a cross-sectional geometry and/or dimensions that are tailored to particular paint characteristics. In this manner, plurality of grooves 62 may separate the paint into multiple individual streams that promote a more uniform droplet size of atomized paint passing from paint bell cup 27 to reduce and/or substantially eliminate overspray and non-uniform paint application.

Figure 5:
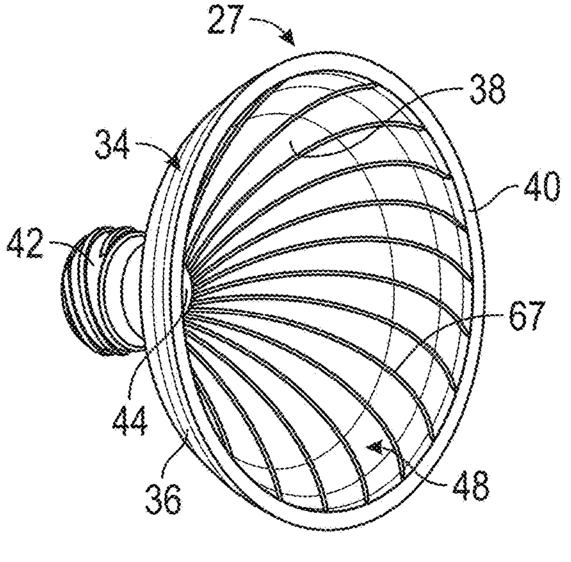
FIG. 5 is a perspective view of the paint bell cup of FIG. 3 having an inner conical surface with spray control features shown in the form of curvilinear grooves, in accordance with a non-limiting example.

FIG. 5 depicts spray control features 48 as a plurality of curvilinear grooves 67 in accordance with another non-limiting example. Plurality of curvilinear grooves 67 extend along inner conical surface 38 toward circumferential edge 40. In one non-limiting example, plurality of curvilinear grooves 67 stop short of circumferential edge 40. In another non-limiting example, plurality of curvilinear grooves 67 extends from circumferential edge 40 and stop short of stem 42. Each of the plurality of curvilinear grooves 67 include a cross-sectional geometry and/or dimensions that are tailored to particular paint characteristics.

Further, each of the plurality of curvilinear grooves 67 include an arc that corresponds to a flow path of the paint created by rotation of paint bell cup 27 in accordance with a non-limiting example. In this manner, plurality of curvilinear grooves 67 separate the paint into multiple individual streams that follow a rotationally induced flow path along inner conical surface 38 to promote a more uniform droplet size of atomized paint passing from paint bell cup 27 to reduce and/or substantially eliminate overspray and non-uniform paint application.

Figure 6:
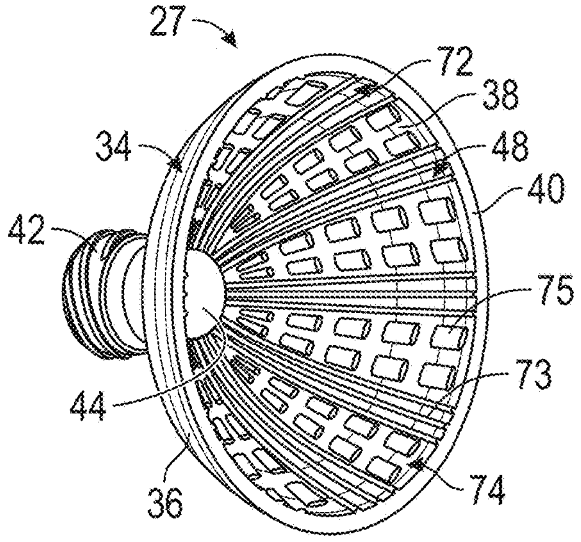
FIG. 6 is a perspective view of the paint bell cup of FIG. 3 having an inner conical surface with spray control features shown in the form of raised elements and recessed elements, in accordance with a non-limiting example.

FIG. 6 depicts spray control features 48 as a plurality of raised elements 72 that may take the form of raised ribs 73 and a plurality of recessed elements 74 that may take the form of shaped indentations 75 in accordance with a non-limiting example. Raised elements 72 and recessed elements 74 may be uniformly distributed across inner conical surface 38 so as to impart a selected turbulence to the spray of paint. Raised elements 72 and recessed elements 74 include a geometry and/or dimension that is tailored to particular paint characteristics such as viscosity, mass, density, and the like to promote a more uniform droplet size of atomized paint passing from paint bell cup 27 to reduce and/or substantially eliminate overspray and non-uniform paint application.

Figure 7:
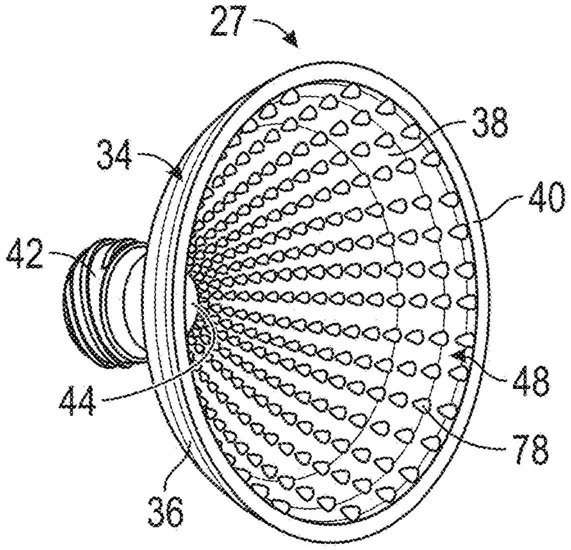
FIG. 7 is a perspective view of the paint bell cup of FIG. 3 having an inner conical surface with spray control features shown in the form of raised bumps, in accordance with a non-limiting example.

FIG. 7 depicts spray control features 48 as a plurality of raised bumps 78 uniformly distributed over inner conical surface 38 in accordance with a non-limiting example. The plurality of raised bumps 78 may also be provided on circumferential edge 40. The plurality of raised bumps 78 include a geometry and/or dimension that is tailored to particular paint characteristics such as viscosity, mass, density, and the like to promote a more uniform droplet size of atomized paint passing from paint bell cup 27 to reduce and/or substantially eliminate overspray and non-uniform paint application.

Figure 8:
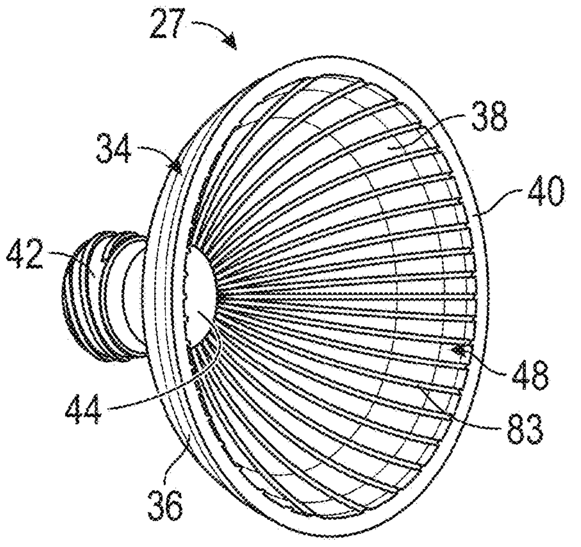
FIG. 8 is a perspective view of the paint bell cup of FIG. 3 having an inner conical surface with spray control features shown in the form of raised ribs, in accordance with a non-limiting example.

FIG. 8 depicts spray control features 48 as a plurality of raised ribs 83 uniformly distributed over inner conical surface 38 in accordance with a non-limiting example. The plurality of raised ribs 83 may also be provided on circumferential edge 40. The plurality of raised ribs 83 include a geometry and/or dimension that is tailored to particular paint characteristics such as viscosity, mass, density, and the like to promote a more uniform droplet size of atomized paint passing from paint bell cup 27 to reduce and/or substantially eliminate overspray and non-uniform paint application.

Figure 9:
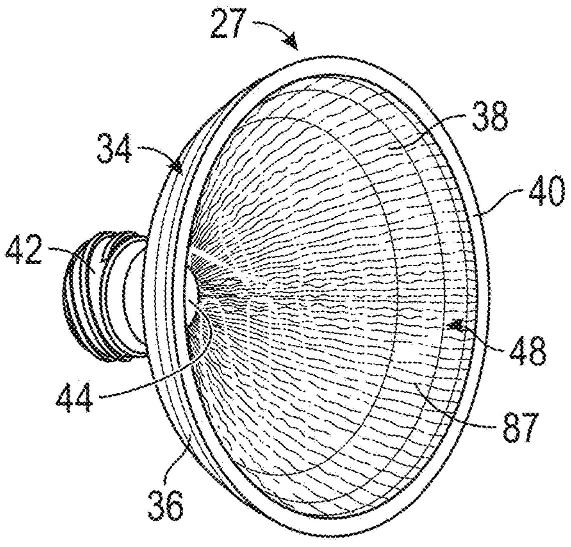
FIG. 9 is a perspective view of the paint bell cup of FIG. 3 having an inner conical surface with spray control features, in accordance with a non-limiting example.

FIG. 9 depicts spray control features 48 as a random array of raised elements 87 distributed over inner conical surface 38 in accordance with a non-limiting example. The random array of raised elements 87 may also be provided on circumferential edge 40. The random array of raised elements 87 include a geometry, dimension(s), and/or distribution that is tailored to particular paint characteristics such as viscosity, mass, density, and the like to promote a more uniform droplet size of atomized paint passing from paint bell cup 27 to reduce and/or substantially eliminate overspray and non-uniform paint application.

Figure 10:
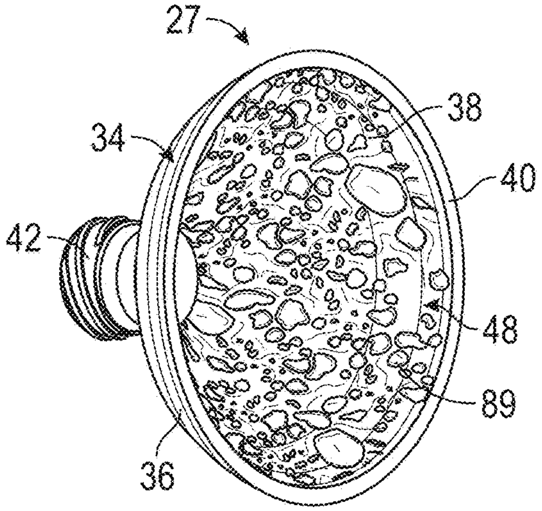
FIG. 10 is a perspective view of the paint bell cup of FIG. 3 having an inner conical surface with spray control features, in accordance with a non-limiting example.

FIG. 10 depicts spray control features 48 as surface texturing 89 imparted to inner conical surface 38 in accordance with a non-limiting example. Surface texturing 89 may also be applied to circumferential edge 40. In a non-limiting example, surface texturing 89 may include raised portions (not separately labeled) and recessed portions (also not separately labeled) randomly distributed over inner conical surface 38. Surface texturing 89 includes a geometry, dimension(s), and/or distribution that is tailored to particular paint characteristics such as viscosity, mass, density, and the like to promote a more uniform droplet size of atomized paint passing from paint bell cup 27 to reduce and/or substantially eliminate overspray and non-uniform paint application.

Figure 11:
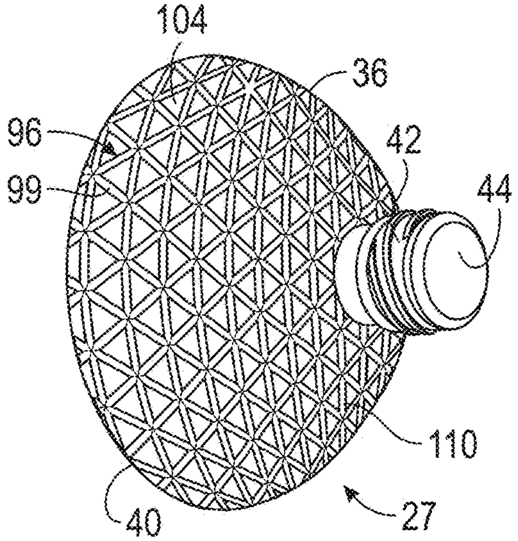
FIG. 11 is a perspective view of the paint bell cup of FIG. 3 formed with an external lattice structure, in accordance with a non-limiting example.
Figure 12:
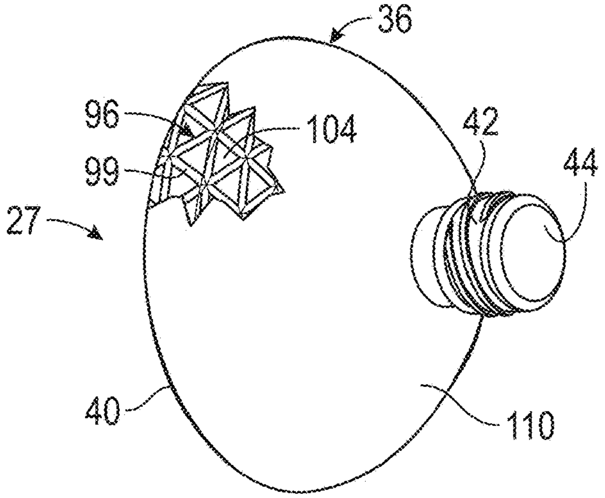
FIG. 12 is a perspective view of the paint bell cup of FIG. 11 showing an outer skin over the internal lattice structure, in accordance with a non-limiting example.

FIG. 11 depicts paint bell cup 27 including a lattice structure 96 that forms outer surface 36, in accordance with a non-limiting example. Lattice structure 96 includes a plurality of interconnected lattice elements 99 that form a plurality of voids 104. In a non-limiting example, the plurality of interconnected lattice elements 99 provide structural support for paint bell cup 27 while the plurality of voids 104 reduce weight. Interconnected lattice elements 99 include a geometry, dimension(s), and/or distribution/design including size, shape, number, and distribution of voids 104 that is tailored to particular stresses that may be perceived by paint bell cup 27. In a non-limiting example depicted in FIG. 12, lattice structure 96 may be covered by a skin 110. Skin 110 provides additional structure support without contributing, in an appreciable manner, to an overall weight of paint bell cup 27

Figure 13:
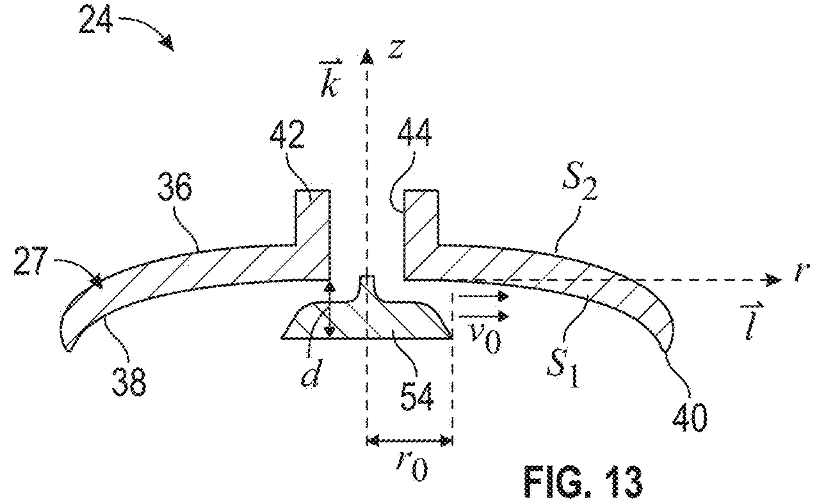
FIG. 13 is a perspective view of the paint bell cup of FIG. 3 having an inner conical surface with spray control features shown in the form of a selected curve shape of the inner conical surface, in accordance with a non-limiting example.

In accordance with another non-limiting example illustrated in FIG. 13, spray control features 48 are defined by a particular geometry or curvature of inner conical surface 38 that is tailored to characteristics of a particular paint type. In a non-limiting example, the curvature of inner conical surface 38 is defined by equation (1) shown below where paint droplet motion in the "r" direction is governed by equation (2) and droplet motion in the "z" direction is governed by equation (3). It should thus be understood that the curvature of inner conical surface 38 may be governed by equation (4). The particular curvature is designed to reduce frictional forces between the paint and cup body 34 to as to ensure more complete atomization and a more uniform droplet size that reduces overspray. By reducing overspray an overall amount of paint used during a painting operation to cover surface 19 is reduced.

$$\vec{s_1} = r(t)\vec{i} + z(t)\vec{k} \tag{1}$$

$$r(t) = r_0 e^{\frac{\omega^2 t^2}{2}} + v_0 t \tag{2}$$

$$z(t) = -0.5gt^2 \tag{3}$$

$$\vec{s_1} = r(t)\vec{i} + z(t)\vec{k} = \left(r_0 e^{\frac{\omega^2 t^2}{2}} + v_0 t\right)\vec{i} - 0.5gt^2\vec{k} \tag{4}$$

where $S_1$ is the curvature of the inner conical surface 38; $r_0$ is the radius of stem 42

In a non-limiting example, paint flows from stem 42, through passage 44, and is deflected by diverter member 54 to inner conical surface 38 of paint bell cup 27. Paint bell cup 27, spinning at a high speed, accelerates the paint flowing along inner conical surface 38 and provides the kinetic energy to break up paint flow into tiny droplets as it exits the circumferential edge 40. Friction force of the paint flow may erode inner conical surface 38 and thus reduce an overall operational life of paint bell cup 27. Forming inner conical surface 38 to have a geometry as defined by equation (4) reduces frictional forces for a particular range of rotational speeds and paint bell cup diameter and thereby enhances an overall operational life of paint bell cup 27.

In accordance with a non-limiting example, paint bell cup 27 may be formed from a variety of materials. The particular material chosen may depend upon one or more characteristics of the paint being applied. The material may be a metal, a non-metal, ceramics, and or a composite. In a non-limiting example, paint bell cup 27 is formed from an electrically conductive material that allows an electrical charge to pass from spray delivery system 18 to the paint. Paint bell cup 27 may be formed using a variety of manufacturing techniques including molding, machining, stamping, additive manufacturing and combinations thereof. The spray control feature may be formed contemporaneously with paint bell cup 27. In another non-limiting example, spray control features may be applied to or formed on inner conical surface 38 after forming paint bell cup 27.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A paint bell cup for directing a spray of paint onto a surface comprising:
- a cup body having an outer surface,
- an inner conical surface having a circumferential edge, and
- a stem extending from the outer surface, the stem including a passage that delivers paint toward the inner conical surface,
- wherein the cup body includes one or more spray control features that extend along the inner conical surface toward the circumferential edge, the one or more spray control features promoting a selected uniform droplet size of the paint traveling from the stem toward the circumferential edge,
- wherein the one or more spray control features include grooves formed on the inner conical surface, the grooves extending along the inner conical surface toward the circumferential edge, and
- wherein the grooves extend from the stem across the inner conical surface and up to the circumferential edge.

2. The paint bell cup according to claim 1, further comprising a diverter member arranged at the stem, the diverter member guiding the paint along the one or more spray control features on the inner conical surface.

3. The paint bell cup according to claim 1, wherein the one or more spray control features include one of a plurality of raised elements and a plurality of recessed elements.

4. The paint bell cup according to claim 3, wherein the one or more spray control features includes a raised element and a recessed element.

5. The paint bell cup according to claim 3, wherein the plurality of raised elements include one of a plurality of raised bumps and plurality of raised ribs.

6. The paint bell cup according to claim 3, wherein the plurality of raised elements forms a random pattern.

7. The paint bell cup according to claim 3, wherein the plurality of raised elements forms a uniform pattern.

8. The paint bell cup according to claim 1, wherein the cup body includes a lattice structure having a plurality of interconnected lattice elements.

9. A paint spray system comprising:
- a source of paint;
- a paint motive device; and
- the paint bell cup of claim 1,
- wherein the paint bell cup is configured to direct the spray of paint from the source of paint motivated by the paint motive device onto the surface.

10. The paint spray system according to claim 9, wherein the one or more spray control features include one of a plurality of raised elements and a plurality of recessed elements.

11. The paint spray system according to claim 9, wherein the cup body includes a lattice structure having a plurality of interconnecting elements defining a plurality of voids.

12. A paint bell cup for directing a spray of paint onto a surface comprising:
- a cup body having an outer surface,
- an inner conical surface having a circumferential edge, and
- a stem extending from the outer surface, the stem including a passage that delivers paint toward the inner conical surface,
- wherein the cup body includes one or more spray control features that extend along the inner conical surface toward the circumferential edge, the one or more spray control features promoting a selected uniform droplet size of the paint traveling from the stem toward the circumferential edge,
- wherein the one or more spray control features include grooves formed on the inner conical surface, the grooves extending along the inner conical surface toward the circumferential edge, and
- wherein the grooves extend from the circumferential edge and stop short of the stem.

13. A paint spray system comprising:
- a source of paint;
- a paint motive device; and
- the paint bell cup of claim 12,
- wherein the paint bell cup is configured to direct the spray of paint from the source of paint motivated by the paint motive device onto the surface.

14. A paint bell cup for directing a spray of paint onto a surface comprising:
- a cup body having an outer surface,
- an inner conical surface having a circumferential edge, and
- a stem extending from the outer surface, the stem including a passage that delivers paint toward the inner conical surface,
- wherein the cup body includes one or more spray control features that extend along the inner conical surface toward the circumferential edge, the one or more spray control features promoting a selected uniform droplet size of the paint traveling from the stem toward the circumferential edge, wherein the cup body includes a lattice structure having a plurality of interconnected lattice elements, and wherein the lattice structure include a plurality of voids and an the outer surface includes a skin covering the lattice structure.

15. The paint bell cup according to claim 14, wherein the inner conical surface includes a geometry defined by the equation:

$$\vec{s_1} = r(t)\vec{i} + z(t)\vec{k} = \left(r_0 e^{\frac{\omega^2 t^2}{2}} + v_0 t\right)\vec{i} - 0.5 g t^2 \vec{k}.$$

16. The paint bell cup according to claim 14, wherein the one or more spray control features include grooves formed on the inner conical surface, the grooves extending along the inner conical surface toward the circumferential edge.

17. The paint bell cup according to claim 16, wherein the grooves extend from the stem across the inner conical surface and up to the circumferential edge.

18. The paint bell cup according to claim 16, wherein the grooves extend substantially linearly across the inner conical surface.

19. The paint bell cup according to claim 16, wherein the grooves extend curvilinearly across the inner conical surface.

20. A paint spray system comprising:

a source of paint;

a paint motive device; and the paint bell cup of claim 14, wherein the paint bell cup is configured to direct the spray of paint from the source of paint motivated by the paint motive device onto the surface.

* * * * *